United States Patent
Hofmann et al.

(10) Patent No.: US 7,158,592 B2
(45) Date of Patent: Jan. 2, 2007

(54) METHOD AND APPARATUS FOR SYNCHRONIZING DATA TRANSFER

(75) Inventors: James W. Hofmann, Allentown, PA (US); Donald Raymond Laturell, Allentown, PA (US); Vladimir Sindalovsky, Perkasie, PA (US); Steven E. Strauss, Orefield, PA (US); Eric Wilcox, Allentown, PA (US)

(73) Assignee: Agere Systems, Inc., Allentown, PA (US)

( * ) Notice: Subject to any disclaimer, the term of this patent is extended or adjusted under 35 U.S.C. 154(b) by 830 days.

(21) Appl. No.: 09/895,991

(22) Filed: Jun. 29, 2001

(65) Prior Publication Data

US 2002/0122514 A1   Sep. 5, 2002

Related U.S. Application Data

(60) Provisional application No. 60/244,391, filed on Oct. 31, 2000.

(51) Int. Cl.
   *H04L 7/00* (2006.01)
(52) U.S. Cl. .................. 375/354; 375/365; 375/355; 370/503
(58) Field of Classification Search ............ 375/220, 375/356, 222, 257, 364, 359, 371, 354; 327/237, 327/271; 714/700; 370/501, 517, 503, 85.1, 370/257, 252; 710/129, 100, 104, 58, 5; 395/552, 558, 556, 559, 285, 309, 200.2; 595/881; 713/600, 400, 503, 401, 500; 364/724.1, 364/240, 240.2, 238.2, 239.9, 260, 260.1, 364/DIG. 1; 711/167; 709/253
See application file for complete search history.

(56) References Cited

U.S. PATENT DOCUMENTS

| | | | | |
|---|---|---|---|---|
| 5,367,542 A * | 11/1994 | Guo | .................... | 375/359 |
| 5,548,732 A * | 8/1996 | Hoashi et al. | ............... | 710/105 |
| 5,668,830 A * | 9/1997 | Georgiou et al. | ........... | 375/220 |
| 5,689,534 A * | 11/1997 | Anderson et al. | ........... | 375/364 |
| 5,737,589 A * | 4/1998 | Doi et al. | .................... | 712/503 |
| 5,794,020 A * | 8/1998 | Tanaka et al. | ............... | 713/401 |
| 6,031,847 A * | 2/2000 | Collins et al. | ............... | 370/508 |
| 6,173,345 B1 * | 1/2001 | Stevens | ...................... | 710/100 |
| 6,212,171 B1 * | 4/2001 | LaFollette et al. | .......... | 370/257 |
| 6,279,058 B1 * | 8/2001 | Gulick | ........................ | 710/58 |
| 6,345,072 B1 * | 2/2002 | Liu et al. | .................... | 375/222 |
| 6,370,200 B1 * | 4/2002 | Takahashi | ................... | 375/257 |
| 6,393,577 B1 * | 5/2002 | Akamatsu et al. | .......... | 713/600 |
| 6,401,213 B1 * | 6/2002 | Jeddeloh | ..................... | 713/401 |
| 6,516,040 B1 * | 2/2003 | Lecourtier et al. | .......... | 375/356 |
| 6,667,993 B1 * | 12/2003 | Lippett et al. | .............. | 370/509 |
| 6,725,390 B1 * | 4/2004 | Liu et al. | .................... | 713/401 |

OTHER PUBLICATIONS

Halsell; Data Communications, Computer Networks, and Open Systems; 1996;Addison-Wesly; Fourth Edition; pp. 84, 237-239.*
Bit-Oriented Data Link Control Procedures□□Carlson, D.; Communications, IEEE Transactions on [legacy, pre—1988]□□vol. 28, Issue 4, Apr. 1980 pp. 455-467 □□.*
Services and protocols of the data link layer□□Conard, J.W.; Proceedings of the IEEE□□vol. 71, Issue 12, Dec. 1983 pp. 1378-1383.*
Connections and connectionless data transmission□□Chapin, A.L.; Proceedings of the IEEE□□vol. 71, Issue 12, Dec. 1983 pp. 1365-1371 □□.*

* cited by examiner

*Primary Examiner*—Temesghen Ghebretinsae (57) ABSTRACT

The invention is a method and apparatus for ensuring synchronization for digital communication between a transmitting and a receiving device, particularly when the clock and/or frame synchronization is sourced from a different location than the transmit data.

25 Claims, 5 Drawing Sheets

METHOD AND APPARATUS FOR SYNCHRONIZING DATA TRANSFER

RELATED APPLICATION

This application is a Non-Provisional Application based on U.S. Provisional Application No. 60/244,391, filed Oct. 31, 2000 the disclosure of which is incorporated herein by reference.

FIELD OF THE INVENTION

The invention pertains to digital communication between two circuit components. The invention is particularly adapted for use in connection with the Advanced Communication Riser Integrated Packet Bus communication specification.

BACKGROUND OF THE INVENTION

In many digital communication protocols, and particularly time division multiplex (TDM) protocols, digital data is transmitted in frames, where a frame comprises a plurality of time slots, each time slot corresponding to a transmitted digital symbol (e.g., a bit). As is well known in the art, in a frame, some of the time slots may be dedicated to communication protocol housekeeping information while the remaining time slots are dedicated to actual data communicated between two digital devices. The housekeeping data is usually transmitted at the beginning or the end of the frame. Also as is well known to those of skill in the art, in TDM systems, one or more time slots in a frame are dedicated to a particular communication session between two particular digital devices, while other time slots are dedicated to other communication sessions. Accordingly, multiple communication sessions can be carried on simultaneously.

Many different communication protocols are in use for TDM and other frame-based digital communication paradigms. However, most, if not all, include at least three signal lines, namely, a clock line, a frame synchronization line and a data line. All communication timing is keyed off of the clock, which typically runs at the communication data bit rate of the system or a multiple thereof. Obviously, the actual data being exchanged between two devices is transmitted on the data line (if serial) or lines (if parallel). The frame synchronization (or frame sync) line carries a signal that delimits the beginning of each frame. Commonly, the beginning of the frame is delimited by a rising or falling edge on the frame sync line. All of the transmitting and receiving devices synchronize themselves to the frame sync signal so that they will be able to transmit and receive the symbols within the appropriate time slots.

In accordance with many digital communication protocols, the clock and or frame sync signal is always generated by the transmitting device. Other protocols allow or even require one particular device to generate the clock and/or the frame sync signal for another device (or devices). One such protocol is the Integrated Packet Bus (IPB) specification promulgated by the Advanced Communication Riser (ACR) Special Interest Group (SIG). The ACR IPB specification is a protocol particularly designed for communication between a CPU in a personal computer and peripheral devices, particularly communications peripherals, such as home networking hubs, ethernet hubs, modems, DSL modems, cable modems, etc. The ACR IPB specification speaks in terms of a controller and one or more targets. As is well known in the art of general purpose, personal computer design, the trend has been to push out all handling of communications between the CPU and other devices, including peripherals to a dedicated chip, termed the controller. In accordance with the IPB specification, part of the functionality of the controller would be to carry out communications with appropriate target devices, such as the aforementioned modems and networking hubs using the ACR IPB protocol. Typically, the controller will provide the functionality for communicating with other devices also. Under the ACR IPB specification, the bus between the controller and the one or more target devices comprises six lines, namely, a received direction clock (RDCLK), a transmit direction clock (TDCLK), a receive direction frame synchronization signal (RDFRAME), a transmit direction frame synchronization signal (TDFRAME), a transmit direction data line (DATAOUT) for data transmitted from the controller to the target device, and a receive direction data line (DATAIN). In ACR IPB, the transmit direction is the direction from the controller to the target device and the receive direction is the direction from the target device to the controller. Under the ACR IPB protocol, the TDCLK and TDFRAME signals are used for timing in the transmit direction are generated at the controller. In addition, the RDFRAME signal is generated at the controller. Under the ACR IPB protocol, the RDCLK signal can be generated by either the controller or the transmitting target device.

In digital communication protocols in which the clock or frame sync signal for given set of transmission data is generated by a device other than the transmitting device, a delay skew issue arises.

Figure 1A:
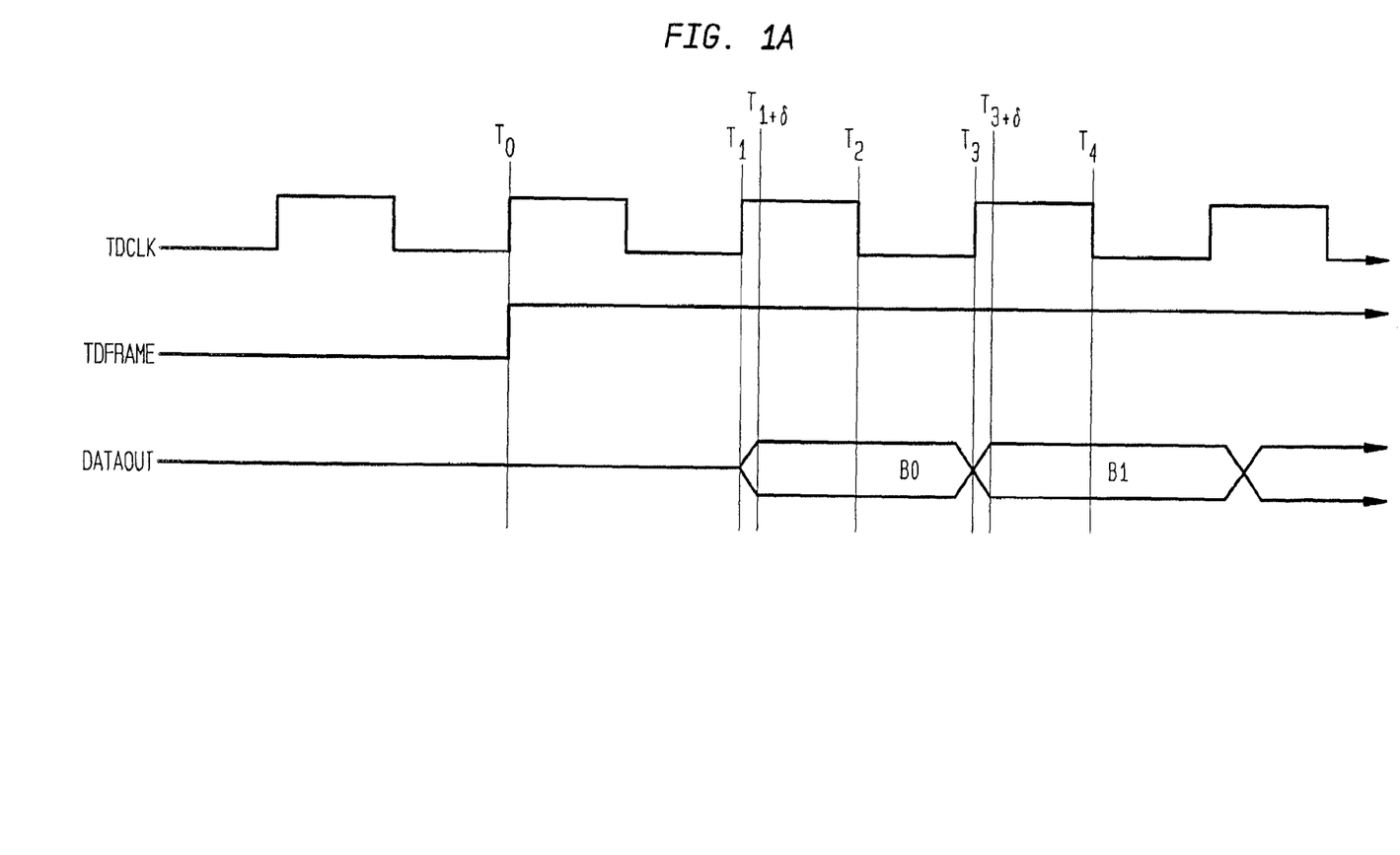
FIG. 1A is a timing diagram for an exemplary frame-based digital communication protocol of the prior art.
Figure 1B:
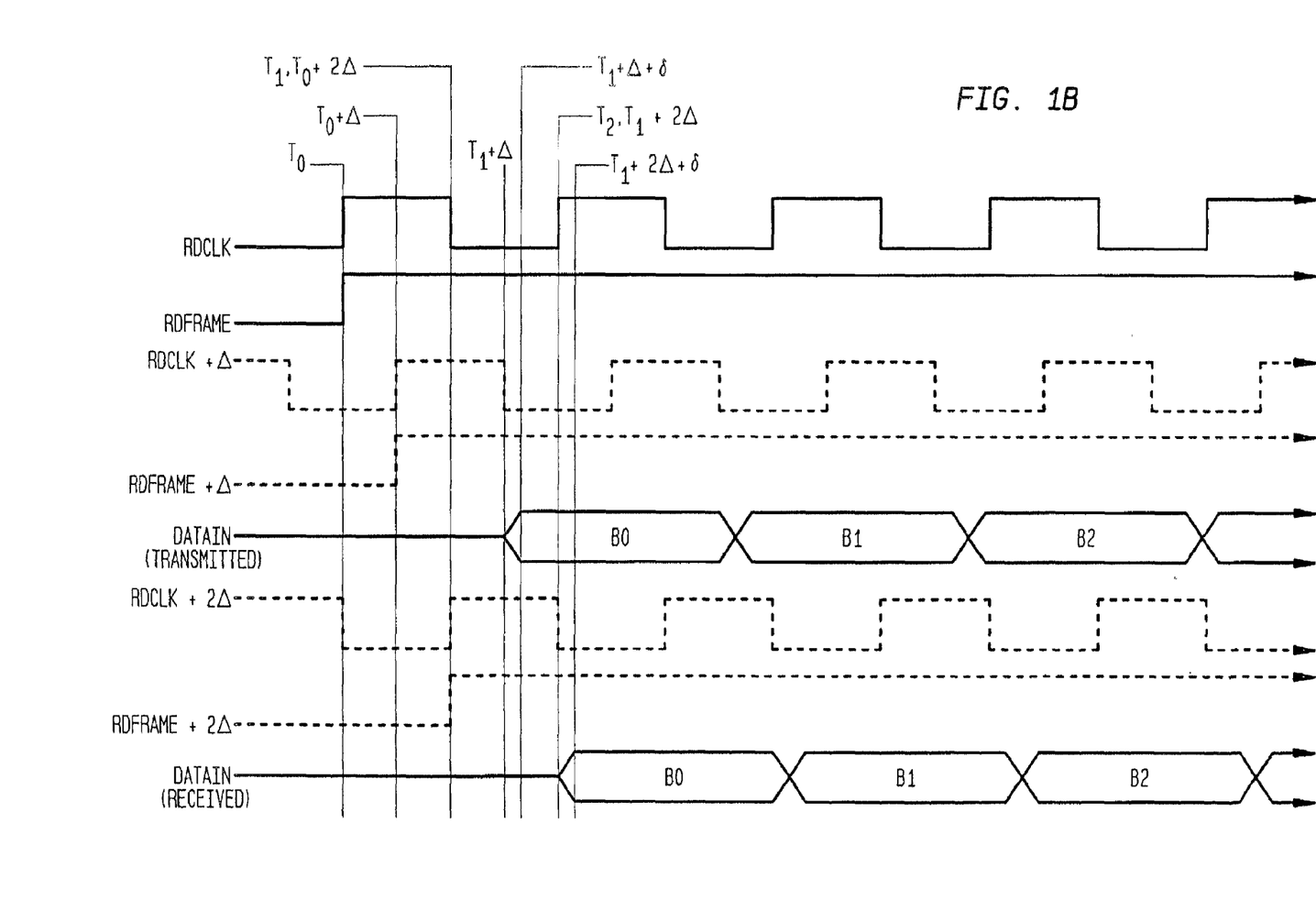
FIG. 1B is a timing diagram for a second exemplary digital communication protocol in accordance with the prior art.

For instance, consider the timing diagrams of FIGS. 1A and 1b. FIG. 1A illustrates an exemplary timing situation for transmit direction data in accordance with the ACR IPB protocol. In accordance with the protocol, the first bit of data, B0 in a frame begins being transmitted by the controller at time $T_1$ at the beginning of the second clock cycle after the leading edge of the frame synchronization signal. In this example, the leading edge of the frame sync signal occurs at time $T_0$ and, for sake of illustrating a worst case scenario, the first clock edge on TDCLK is essentially simultaneous therewith (but late enough to be counted as the first clock edge after the frame sync).

Accordingly, one full clock cycle later, at time $T_1$, the controller begins to transmit the first bit of data. Thus, that data bit becomes fully valid at time $T_1+\delta$. At the falling edge of that clock cycle, at time $T_2$ (note that we are assuming a 50% duty cycle for TDCLK), the receiving target device samples the DATAOUT line to read the bit value. The process then continues for each clock cycle until the end of the frame.

Thus, for example, at $T_3$ (the third rising edge of TDCLK after the beginning of the frame), the controller begins transmitting the second bit. That second bit becomes fully valid at time $T_3+\delta$ and then is sampled by the receiving target device at time $T_4$ (the falling edge half-way through that clock cycle). Since the TDFRAME, TDCLK and DATAOUT signals are all sourced from the same location (i.e., the controller), there are no delay skew issues. Particularly, even though there is some finite time lapse between the transmission of TDCLK, TDFRAME and DATAOUT from the controller and their receipt at the receiving target device, the delay is essentially equal for all three lines.

However, in the receive direction, if the RDCLK and RDFRAME signal are sourced from the controller, while the DATAIN signal is sourced from the transmitting target device, delay skew becomes an issue. For instance, let us consider the example of FIG. 1B. The timing in the example of FIG. 1B differs from that of FIG. 1A in two respects. First, the clock and frame signals are sourced from the controller, whereas the data is sourced from the transmitting target device. Secondly, the first bit of data goes out on the next clock edge (i.e., half of a clock cycle) after the first clock edge after the frame sync signal, instead of a full clock cycle after the first clock edge after the frame sync signal.

This situation presents two potential timing problems. First, if the clock rate is very fast, the transmitting target device simply may not be able to generate the first bit of the frame within the allotted time. Particularly, FIG. 1B illustrates something close to a worse case scenario in which the first clock edge after the frame sync signal occurs essentially simultaneously with the frame sync signal at time $T_0$, but late enough to be counted as the first clock edge after the frame sync. Then the transmitting target device has only until $T_1$, i.e. half a clock cycle later, to output the first bit of data. Some delay past $T_1$ is acceptable, because that data really only needs to be fully valid by time $T_2$ when the controller will read the data. Accordingly, the target device has slightly less than one full clock cycle after the frame sync to output fully valid data. At very high clock speeds, this may be very difficult to achieve. For instance, the ACR IPB specification specifies a 40 MHz data rate, which could make it very difficult for a transmitting target device to place the data in the first bit position of a frame in time.

A second timing issue arises due to delay skew since the clock and frame signals are sourced from the controller, but the data is sourced from the target device. Particularly, as previously noted, the transmitting device will begin transmitting a bit at the leading edge of a clock cycle and that data must be fully valid at the transmitting device at the midpoint edge of that clock cycle. However, there is some finite delay between the time the controller generates the leading edge of that clock cycle and the time that it is received at the target device. Further, there is a delay between the time the transmitting target device generates the data and the time it is received at the receiving controller. The sum of these two delays is called round trip delay. The round trip delay includes not only the path delay but printed circuit board delay and, possibly, a connector delay as well as internal device delays. If the round trip delay is greater than half a clock cycle (assuming a 50% duty cycle), the data cannot arrive at the controller by the time the controller samples for that bit.

Thus, referring to FIG. 1B, the controller experiences the first clock edge after the frame sync at time $T_0$, and expects the target device to begin transmitting the data at time $T_1$, and will sample for the data at time $T_2$, just as in FIG. 1A. However, the target device experiences the first clock edge after the frame sync at time $T_0+\Delta$ and begins transmitting the bit at time $T_1+\Delta$. Even further, the controller actually receives the beginning of the transmission of the data at time $T_1+2\Delta$. Of course, we also must add in the delay, $\delta$, between the transmitting device commencing transmission of that bit and the bit value becoming fully valid. Accordingly, the data is not fully valid at the receiving controller until time $T_1+2\Delta+\delta$. If $2\Delta+\delta$ is greater than a half clock cycle (as shown in FIG. 1B), the data will not reach the controller after time $T_2$ when the controller looks for the data.

SUMMARY OF THE INVENTION

The invention is a method and apparatus for ensuring synchronization for digital communication between a transmitting and a receiving device, particularly when the clock and/or frame synchronization signal is sourced from a different location than the transmit data. In accordance with a first aspect of the invention, the transmitting device employs a look ahead algorithm to begin transmitting data before actual receipt of the frame synchronization signal. Particularly, after the first frame synchronization signal is received, the transmitting device has an expectation of when the next (and each subsequent) frame synchronization signal will be received and begins transmitting the data in anticipation of receipt of the frame synchronization signal.

In accordance with a second aspect of the invention, at the initialization of a communication session between two particular devices, e.g., a controller and a target device, a test communication session is conducted in which the receiving target device receives an instruction from the controller to transmit a test pattern (i.e., a series of consecutive bits of known pattern) at the beginning of the next frame. The controller then looks for receipt of that test pattern using the designated time slots in accordance with the protocol (assuming no delay skew). If it does not receive that test pattern, then it does the test again, except sampling for the bits of the test pattern with some predetermined delay for the sampling points. For instance, the delay may be, half a clock cycle. The process continues, with the controller adding another predetermined delay period on top of the previous delay period until it detects receipt of the bit sequence of the known test pattern. At that point, it thereafter samples received data from that target device using the determined delay period.

DETAILED DESCRIPTION OF THE INVENTION

The invention will herein be described in connection with one or more particular embodiments adapted for use in connection with the ACR-IPB protocol. However, it should be understood that the invention has much broader applicability and can be used in connection with virtually any digital communication protocol that employs a start signal, such as a frame synchronization signal. Further, it is particularly suited for use with a digital communication system in which the start signal is sourced from a different location than the actual data that is being transmitted.

Figure 2:
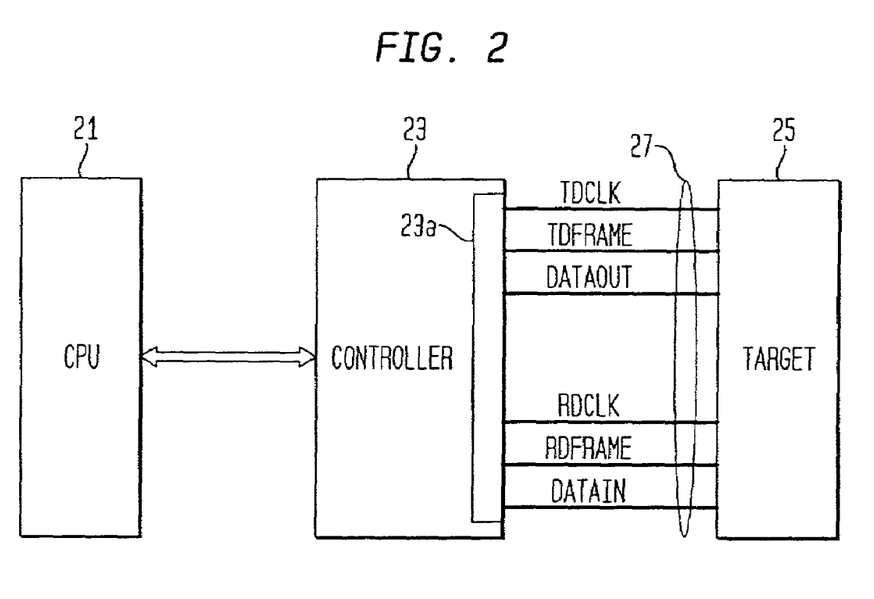
FIG. 2 is a block diagram illustrating the basic relationship of components in a computer in accordance with the present invention.

FIG. 2 is a block diagram illustrating a typical architecture for a computing device utilizing the ACR-IPB communication protocol for communication with other devices. The computing device comprises a CPU 21 which communicates with a target device 25, such as a modem, through a separate controller integrated circuit 23. Typically, the controller 23 will oversee communications between the CPU and various peripheral devices. Hence, only a portion 23a of chip 23 will be dedicated to controlling ACR-IPB communications with target devices like target device 25.

In accordance with the ACR-IPB protocol, there are six lines comprising the bus 27 between the controller 23 and the target 25. The IPB bus 27 includes a transmit (TDCLK) line on which the controller places a clock signal with a maximum rate of 40 MHz. The transmit direction frame line (TDFRAME) carries the transmit direction frame synchronization signal, which also is generated by the controller. In one embodiment, the frame start signal comprises a rising edge on TDFRAME. The DATAOUT line is the line on which the actual data being transmitted from the controller to the target is placed. In accordance with the ACR-IPB protocol, separate lines are maintained for the transmit and receive directions. Accordingly, there also are RDCLK, RDFRAME and DATAIN lines on which corresponding signals in the receive direction, i.e., from the target 25 to the controller 23, are carried.

As previously noted, the ACR-IPB protocol requires the transmitting target device to begin driving data onto the DATAIN line. The data must be fully valid one clock phase later in order for the controller to read the bit correctly since the ACR-IPB protocol specifies enter sampling (i.e., sampling on the following clock edge (and assuring a 50% duty cycle). At the second clock edge on RDCLK after the frame start and, if the first clock edge is virtually simultaneous with the frame start signal, this provides only slightly longer than one clock phase (e.g., half a clock cycle)to drive the first bit of data in the frame onto DATAIN. At a 40 MHz data bit rate, it can be extremely difficult for a target device to drive the first bit of data on the DATAIN line in time to meet this requirement. This timing problem can be alleviated if the target device predicts the arrival of the frame start signal (a rising edge on RDFRAME) and begins to drive data onto the DATAIN line before actual receipt of the start signal. Particularly, the start signal on RDFRAME occurs at regular intervals, and specifically, every sixteen time slots. Accordingly, after a first start frame signal is received by the target device on RDFRAME, the target device can thereafter predict when the next start signal will be received on RDFRAME. It can then set up the data for transmission ahead of time so that the bit will be ready for transmission when the second clock edge after the frame start arrives. For instance, assuming that the target device has already received at least one frame start signal on RDFRAME and it can predict the arrival of future frame start signals. Accordingly, a frame start signal is expected exactly sixteen clock cycles after receipt of the last frame start signal, which we shall call time $T_0$. Accordingly, at time $T_{0-\gamma}$, the target device begins setting up the data for transmission. The period $\gamma$ should be set as a function of the amount of time necessary to set up the data for transmission such that the target device can be ready to transmit the data within the worst case timing scenario, namely, one half clock cycle after time $T_0$.

In at least one embodiment, the target device also can begin transmitting the data before the second clock edge after the start signal. However, it typically should not be necessary to begin transmitting the data before the appropriate clock edge. Specifically, the issue with respect to timely placing the first bit of the frame on the DATAIN line is primarily a function of the time required to initially set up the data. Once the data are set up, the target device should be able to begin transmitting the first bit (as well as all subsequent bits in the frame) at the appropriate clock edge and that data should be valid within half a clock cycle, (when the controller samples for the data).

However, the second timing issue mentioned above is an issue for all transmitted bits. As previously noted, the transmitting target device is supposed to begin transmitting the bits at the leading edges of the clock cycles and the controller will sample for the bits of the frame at the center of each clock cycle. If the round trip delay from the controller to the target device and back, $2\Delta$, plus the time for the data to become fully valid, $\delta$, exceeds half a clock cycle, the data will not be received at the controller at the midpoint of the clock cycle, when it is sampled. This problem is an issue with respect to every bit in the frame, but is particularly troublesome with respect to the first bit because of the extra set up time needed before the first bit can be driven onto the DATAIN line.

The round trip delay is dependent on PCB implementation and internal sampling delays which likely are vendor specific. Thus, one cannot accurately characterize these delays prior to physical system test. Further, the maximum length of the board interconnect between the ACR target device and the controller is not currently specified in the ACR-IPB specification. Therefore, accurate analysis of board interconnect delays is not possible. This issue is particularly important given that the ACR-IPB specification defines a maximum clock frequency of 40 MHz.

If the controller delays its sampling times past the mid point of the clock cycle by roughly $2\Delta+\delta$, it will sample the data correctly for all time slots of the frame. However, as previously noted, the delay period generally will not be known ahead of time. Hence, in accordance with the invention, during initialization of a communication session between the controller and a target device, an appropriate delay period for sampling is determined and thereafter applied to all transmissions from the target device and the controller.

In one preferred embodiment of the invention, during initialization of a communication session between the controller and a target device, the controller issues an instruction to the target device to transmit a predetermined test pattern back to the controller in the next receive direction frame. The particular pattern may be a full frame length or shorter. The particular pattern can be selected in accordance with well known techniques to minimize the effect of transmission errors. Both the controller and target device know the predetermined bit pattern. The target device, for instance, may have it permanently stored in a buffer.

Figure 3:
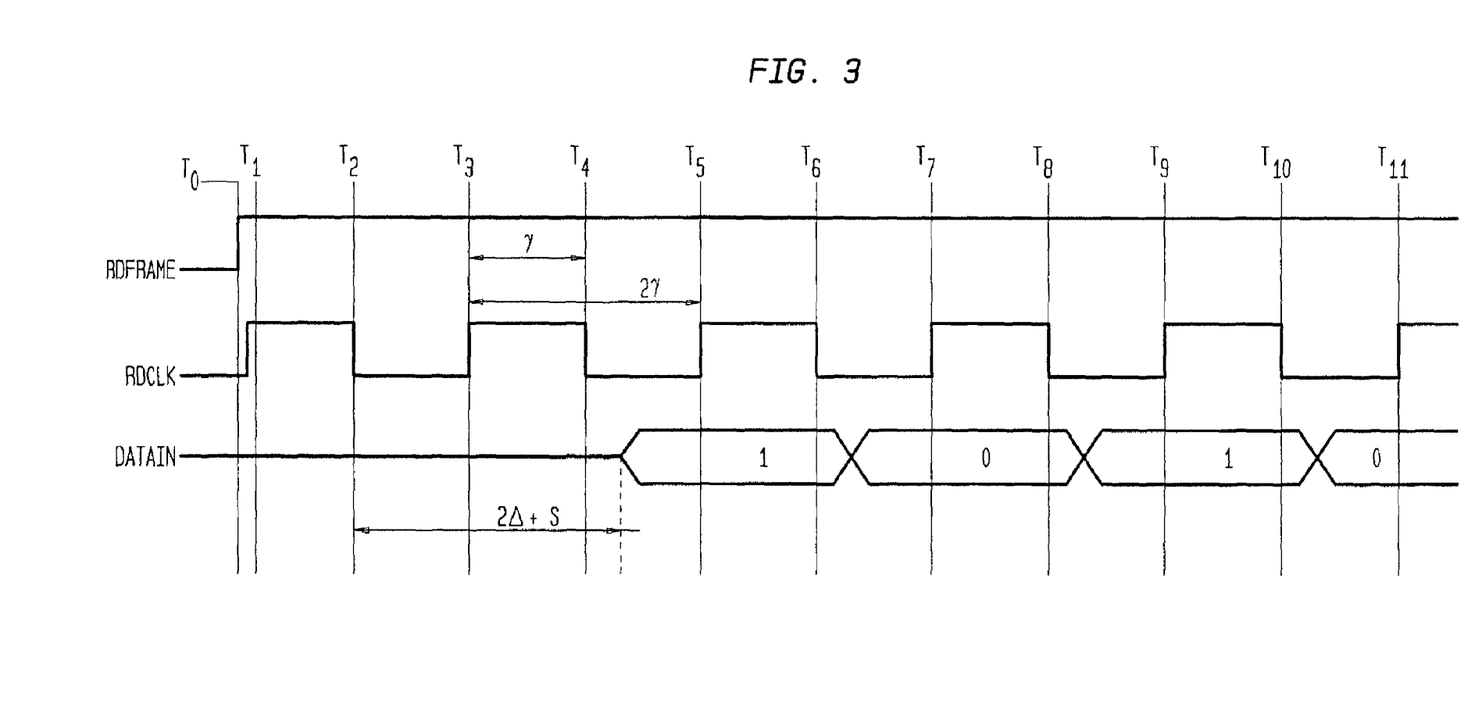
FIG. 3 is a timing diagram illustrating timing initialization in accordance with the present invention.

FIG. 3 is a timing diagram illustrating timing initialization in accordance with the present invention upon the initiation of a communication session between the controller and a target device that will determine the round trip delay between the controller and the target device and compensate for it.

Let us assume that the frame synchronization signal arrives at time $T_0$ and the first rising clock edge on RDCLK arrives shortly thereafter at time $T_1$. Accordingly, at the falling edge of the clock, at time $T_2$, in theory, the target device should begin transmitting the first bit of the predetermined pattern and the controller should be able to sample correct data at time $T_3$. However, in this example, let us assume that the leading edge of the first bit does not arrive at the controller (for the various delay reasons previously discussed) until shortly after time $T_4$. Let us further assume that the first four bits of the predetermined pattern are 1010 and that this is the pattern that the controller is expecting to detect. The controller will sample the DATAIN line at the rising edge of each clock pulse on RDCLK, namely, times $T_3$, $T_5$, $T_7$, $T_9$, $T_{11}$, . . . . It can be seen in FIG. 3 that the controller will not detect the first four bits of the test pattern,

1010, but will instead detect an indeterminate value at the first sampling point at $T_3$ then will detect 101 at times $T_5$, $T_7$, $T_9$ and $T_{11}$. Accordingly, it will determine that it has not received the correct pattern 1010 . . . but has instead received ?101 . . .

If the delay $2\Delta+\delta$ had been less than half a clock cycle, the controller would have detected the correct predetermined bit pattern and no further steps would be necessary. However, since it did not detect the predetermined bit pattern, it will again send the instruction to the target device to send the predetermined pattern at the beginning of the next frame. In the next frame, the controller will set its sample points with a delay. In this example, the delay, $\gamma$, is half a clock cycle. Accordingly, instead of sampling for the predetermined pattern with sampling points $T_3$, $T_5$, $T_7$, $T_9$, $T_{11}$, . . . , it will sample at points $T_4$, $T_6$, $T_8$, $T_{10}$, . . . Again, however, as can be seen in FIG. 3, the controller will not detect the correct pattern, the sampling points still being too early since the first bit of the test pattern does not arrive until shortly after time $T_4$. Accordingly, the controller will run the test once again, this time adding $2\gamma$ as a delay to its sampling points. In this third test, the sampling points will be $T_5$, $T_7$, $T_9$, $T_{11}$, . . . . As can be seen in FIG. 3, this time, the controller will detect the correct pattern 1010 . . . . The controller will then know $2\gamma$ is an appropriate delay period to compensate for the delay $2\Delta+\delta$ inherent in receiving data from this particular target device. The controller will thereafter utilize $2\gamma$ as a delay period for all further transmissions received from this particular target device.

In the example of FIG. 3, the sampling delay increment was half a clock cycle. However, the increment can be any amount less than one full clock cycle. Since each data bit is driven onto DATAIN for one clock cycle, if the delay increment is greater than one full clock cycle, it would be possible to completely jump over the correct sampling point. Also, it is not necessary that the increment be a constant. For instance, it may be desirable for the increment to decrease with each subsequent test. Increments of one half clock cycle or less should work well.

In one preferred embodiment of the invention, each delay period is tested twice. Only if the pattern is detected both times is the corresponding delay period deemed correct. This feature can help eliminate false positives that may occur due to glitches in the system, such as temporary noise or where a particular delay period puts the sampling point right on the edge of proper timing. Since each data bit is driven an DATAIN for a full clock cycle, if the delay increments are substantially smaller than one clock cycle, there will be several sampling delay intervals that will provide accurate sampling. Accordingly, using a delay interval that is greater that the absolute minimum delay interval necessary will have no adverse effect.

In other embodiments, the controller may send only one instruction to the target device to send the predetermined bit pattern per delay period, but the controller tests for receipt of the pattern in the next two frames, rather than just the next frame. This embodiment is beneficial in that, in some circumstances, it is possible that the target device may take a longer time to initiate than the controller such that, the target device cannot respond to the instruction from the controller to send the pre-determined pattern by the time the next frame sync signal arrives. In such a situation, the controller may not receive the predetermined pattern, not because it is sampling too early, but because the target device did not initialize fast enough to send the pattern in the next frame after the controller issued the instruction, but instead sends the pattern in the next frame after that one. Thus, testing for the pattern in two connections frames can eliminate the problem.

Figure 4:
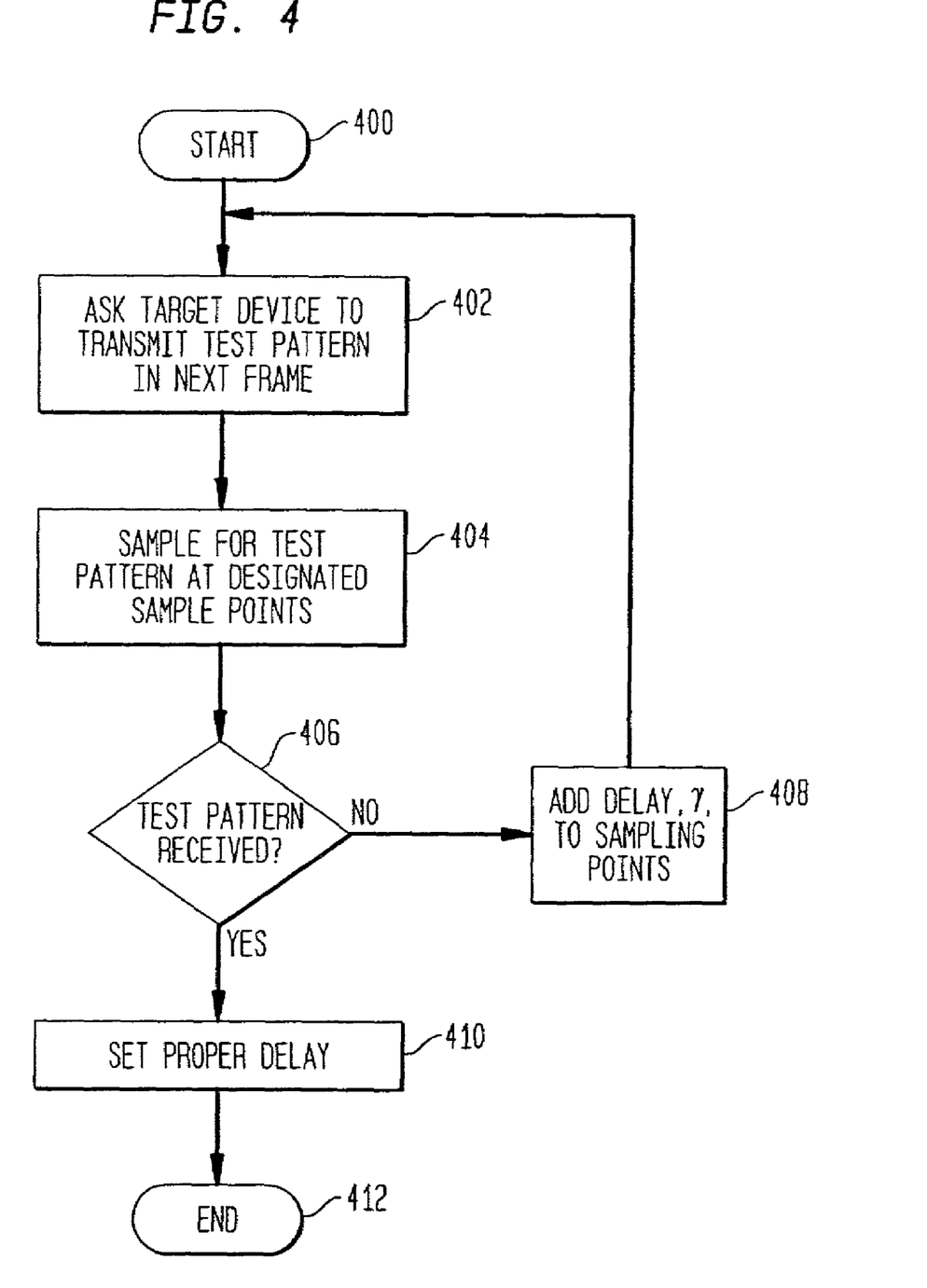
FIG. 4 is a flow chart illustrating a digital communication initialization process in accordance with the present invention.

FIG. 4 is a flow diagram illustrating the basic steps performed by the controller in accordance with a basic embodiment of the present invention. The process starts at step 400 upon initialization of a communication session between the controller and a particular target device. In step 402, the controller issues an instruction to the target device to transmit the test pattern commencing in the first time slot of the next frame (as determined by the next rising edge on RDFRAME). In step 404, the controller samples for the test pattern in the next frame as dictated as RDFRAME. In step 406, the controller compares the data detected in step 404 to the pre-determined test pattern. If no match is detected, flow proceeds to step 408 in which the controller adds a pre-determined delay, $\gamma$, to the sampling points. Flow then proceeds back to step 402 where the test is repeated. Flow proceeds through steps 402, 404, 406 and 408 until the predetermined pattern is detected in step 406. At that point, flow proceeds to step 410, where the delay period $\gamma$ used in the last trip through step 408 is set for use in all future communications with that target device. The process ends at step 412.

The embodiment described above in which the controller issues an instruction for the target to send a predetermined bit pattern is merely an exemplary embodiment. Embodiments are envisioned in which no instruction from the controller is necessary and the target simply sends the test patterns responsive to frame start signals on RDFRAME. The controller can sample for the test pattern continuously for a pre-determine number of frames before incrementing the delay period and continuous sampling.

The appropriate delay period can and typically would be different for each target device. Thus, the controller would need to include logic or software for keeping track of the appropriate delay period for each target device with which it communicates.

Embodiments are envisioned in which, in order to simplify processing at the controller, after determining an appropriate delay period, the controller sends that data to the target device and the target device stores it and sends it to the controller at the beginning of each communication session as part of initialization. In this manner, each target device stores its own delay period for communicating with the controller and the controller is relieved of the burden of storing the various delay periods for all of the target devices with which it communicates.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of digital communication between two devices, said method comprising the steps of:
    (1) a control device transmitting a clock signal, a frame signal and an instruction to transmit a predetermined bit pattern;
    (2) a target device, responsive to receipt of said instruction to transmit a predetermined bit pattern and responsive to receipt of said frame signal, transmitting said predetermined bit pattern using said received clock signal;

(3) said control device sampling for bits of said predetermined bit pattern at predetermined sampling times;

(4) if said control device does not detect said predetermined bit pattern, adding a delay of a fraction of a clock period to said predetermined sampling times and repeating steps (1), (2) and (3);

(5) if said control device detects said predetermined bit pattern, setting a sum of all said delays added in step 4 as a delay period to be used by said control device for sampling data for further transmissions from said target device to said control device;

(6) said control device using said delay period for sampling all further data transmissions from said target device to said control device; and wherein said control device performs step (3) twice before proceeding to steps (4) or (5).

2. The method of claim 1 wherein said frame signal is a frame synchronization signal denoting a beginning of a frame.

3. The method of claim 1 wherein said frame signal is transmitted on a first signal line, said predetermined bit pattern and all further data is transmitted on a second signal line and a clock signal is transmitted on a third signal line and wherein transmissions on said second signal line and said predetermined sampling times are also a function of said clock signal.

4. The method of claim 3 wherein said clock signal is generated at said control device.

5. The method of claim 3 wherein, in step (4), said delay is one-half of a clock cycle.

6. A method of digital communication between two devices, said method comprising the steps of:

(1) a control device transmitting a clock signal, a frame signal and an instruction to transmit a predetermined bit pattern;

(2) a target device, responsive to receipt of said instruction to transmit a predetermined bit pattern and responsive to receipt of said frame signal, transmitting said predetermined bit pattern using said received clock signal;

(3) said control device sampling for bits of said predetermined bit pattern at predetermined sampling times;

(4) if said control device does not detect said predetermined bit pattern, adding a delay of a fraction of a clock period to said predetermined sampling times and repeating steps (1), (2) and (3);

(5) if said control device detects said predetermined bit pattern, setting a sum of all said delays added in step 4 as a delay period to be used by said control device for sampling data for further transmissions from said target device to said control device;

(6) said control device using said delay period for sampling all further data transmissions from said target device to said control device; and, (7) said target device predicting arrival of said frame signal and commencing transmission of data in anticipation of receipt of frame signal.

7. The method of claim 6 wherein said frame signal is a frame synchronization signal denoting a beginning of a frame.

8. The method of claim 6 wherein said frame signal is transmitted on a first signal line, said predetermined bit pattern and all further data is transmitted on a second signal line and a clock signal is transmitted on a third signal line and wherein transmissions on said second signal line and said sampling times are also a function of said clock signal.

9. The method of claim 8 wherein said digital communication is carried out under the control of a controller and is conducted between at least one target device.

10. The method of claim 9 wherein said start of said frame signal and said clock signal are generated at said control device.

11. The method of claim 8 wherein, in step (3), said added delay is one-half of a clock cycle.

12. A communication device for receiving digital data from another device, said communication device comprising:

a receive port for receiving data transmitted to said communication device from a target device;

a processor adapted to:

(a) sample data received at said receive port for a predetermined bit pattern at predetermined sampling times and wherein a frame signal transmitted by said communication device initiates transmittal of said predetermined bit pattern by said target device using a clock signal transmitted from said communication device;

(b) if said communication device does not detect said predetermined bit pattern, adding a delay of a fraction of a clock period to said predetermined sampling times and repeating step (a);

(c) if said communication device detects said predetermined bit pattern, setting a sum of all said delays added in step (b) as a delay period to be used by said communication device for sampling data; and (d) using said delay period for sampling further data transmissions; and wherein said processor performs step (a) twice before proceeding to steps (b) or (c).

13. The communication device of claim 12 further comprising:

means for generating said frame signal; and a second port for transmitting said frame signal to said target device.

14. The communication device of claim 12 wherein said frame signal is a frame synchronization signal denoting a beginning of a frame.

15. The communication device of claim 13 further comprising means for generating said clock signal; and a third port for transmitting said clock signal to said target device and wherein transmission of said predetermined bit pattern and said sampling times also are a function of said clock signal.

16. The communication device of claim 15 wherein said digital communication is carried out under the control of a controller and is conducted between at least one target device.

17. The communication device of claim 12 wherein said processor is further adapted to transmit an instruction to said another device, responsive to which said other device transmits said predetermined bit pattern.

18. A method of receiving digital communication at a receiving device, said method comprising the steps of:

(1) receiving from a transmit device a predetermined bit pattern sent in response to a signal transmitted from said receiving device using a clock signal transmitted from said receiving device;

(2) sampling for bits of said predetermined bit pattern at predetermined sampling times;

(3) if said predetermined bit pattern is not detected, adding a delay of a fraction of a clock period to said predetermined sampling times and repeating steps (1) and (2);

(4) if said predetermined bit pattern is detected, setting a sum of all said delays added in step (3) as a delay period to be used for sampling data for further transmissions from said transmit device;

(5) using said delay period for sampling further data communications from said transmit device; and, wherein said second device performs step (2) twice before proceeding to steps (3) or (4).

19. A method of receiving digital communication at a receiving device, said method comprising the steps of:

(1) receiving from a transmit device a predetermined bit pattern sent in response to a signal transmitted from said receiving device using a clock signal transmitted from said receiving device;

(2) sampling for bits of said predetermined bit pattern at predetermined sampling times;

(3) if said predetermined bit pattern is not detected, adding a delay of a fraction of a clock period to said predetermined sampling times and repeating steps (1) and (2);

(4) if said predetermined bit pattern is detected, setting a sum of all said delays added in step (3) as a delay period to be used for sampling data for further transmissions from said transmit device;

(5) using said delay period for sampling further data communications from said transmit device; and, (6) said transmit device predicting arrival of said frame signal and commencing transmission of data in anticipation of receipt of said frame signal.

20. A communication system comprising a transmitting device and a communication device, wherein said communication device comprises:
a receive port for receiving data transmitted to said communication device from said transmitting device;
a receiver processor adapted to:
(a) sample data received at said receive port for a predetermined bit pattern at predetermined sampling times and wherein a frame signal transmitted by said communication device initiates transmittal of said predetermined bit pattern by said transmitting device using said clock signal transmitted by said communication device;
(b) if said communication device does not detect said predetermined bit pattern, adding a delay of a fraction of a clock period and repeating step (a);
(c) if said communication device detects said predetermined bit pattern, adding a sum of said delays added in step (b) as a delay period to be used by said communication device for sampling data; and
(d) using said delay period for sampling further data transmissions; and, wherein said transmitting device comprises a transmitter processor adapted to predicting arrival of said frame signal and commencing transmission of data in anticipation of receipt of said frame signal.

21. The communication device of claim 20 further comprising:
means for generating said frame signal; and
a second port for transmitting said frame signal to said transmitting device.

22. The communication device of claim 21 further comprising means for generating said clock signal; and
a third port for transmitting said clock signal to said transmitting device and wherein transmission of said predetermined bit pattern and said sampling times also are a function of said clock signal.

23. The communication device of claim 22 wherein said data is transmitted under the control of a controller and is conducted between said communication device at least one target device.

24. The communication device of claim 23 wherein said communication device is said controller and said transmitting device is said target device.

25. The communication device of claim 20 wherein said receiver processor is further adapted to transmit an instruction to said transmitting device, responsive to which said transmitting device transmits said predetermined bit pattern.

* * * * *